United States Patent
Sakurai

(10) Patent No.: US 9,025,094 B2
(45) Date of Patent: May 5, 2015

(54) WAVELENGTH SELECTIVE OPTICAL SWITCHING DEVICES

(75) Inventor: Yasuki Sakurai, Kasugai (JP)

(73) Assignee: Santec Corporation, Aichi (JP)

( * ) Notice: Subject to any disclaimer, the term of this patent is extended or adjusted under 35 U.S.C. 154(b) by 277 days.

(21) Appl. No.: 13/548,401

(22) Filed: Jul. 13, 2012

(65) Prior Publication Data

US 2013/0128215 A1 May 23, 2013

(51) Int. Cl.
| | |
|---|---|
| G02F 1/13 | (2006.01) |
| G02F 1/1335 | (2006.01) |
| G02B 6/35 | (2006.01) |
| G02F 1/1362 | (2006.01) |

(52) U.S. Cl.
CPC ............ *G02B 6/35* (2013.01); *G02F 1/136277* (2013.01)

(58) Field of Classification Search
CPC ............ G03F 7/70241; G03F 7/70275; G03F 7/70308
USPC ..................................... 349/18, 196; 359/356
See application file for complete search history.

(56) References Cited

U.S. PATENT DOCUMENTS

| | | | |
|---|---|---|---|
| 6,707,959 B2 | 3/2004 | Ducellier et al. | |
| 7,162,115 B2 | 1/2007 | Brophy et al. | |
| 7,397,980 B2 | 7/2008 | Frisken | |
| 7,787,720 B2 | 8/2010 | Frisken et al. | |
| 7,843,550 B2 * | 11/2010 | Ishii et al. ........................ | 355/53 |
| 8,373,935 B2 * | 2/2013 | Tseng et al. ................... | 359/713 |
| 8,649,101 B2 * | 2/2014 | Kang et al. ..................... | 359/649 |
| 2004/0150878 A1 * | 8/2004 | Omura .......................... | 359/356 |
| 2005/0012917 A1 * | 1/2005 | Tanaka et al. ................... | 355/67 |
| 2008/0181559 A1 * | 7/2008 | Corem et al. ................... | 385/18 |

* cited by examiner

*Primary Examiner* — Huyen Ngo

(74) *Attorney, Agent, or Firm* — Osha Liang LLP

(57) ABSTRACT

A wavelength selective switch device includes an incidence part where wavelength multiplexed light made of light of a plurality of wavelengths enters, an exit part that includes a plurality of fiber that outputs light of a wavelength selected from a signal in which wavelength multiplexed light that entered from the incidence part enters, a polarization diversity part that separates incidence light that entered the incidence part according to polarization components of the incidence light to make first and second optical beams, a wavelength dispersion and synthesis element that spatially disperses incidence light according to a wavelength of the incidence light and multiplexes the spatially dispersed reflected light according to the wavelength, and a wavelength dispersion and synthesis element that spatially disperses incidence light according to a wavelength of the incidence light and multiplexes the spatially dispersed reflected light according to the wavelength.

10 Claims, 9 Drawing Sheets

Phase Shift Function ø (x)

ID FIELD

The present invention relates to a wavelength selective optical switch device that uses a liquid crystal element such as liquid crystal on silicon (LCOS) used in the field of optical communications.

BACKGROUND TECHNOLOGY

In high speed large capacity optical networks that support today's advanced information and communication companies, wavelength multiplexing optical communication technology is used. Reconfigurable optical add drop multiplexers (ROADM) that provide reconfigurable add drop functionality are being introduced into optical nodes that correspond to branching points of an optical network. Wavelength selective switches (also referred to as WSS) that switch any wavelength in any direction are garnering attention in the implementation of ROADM devices. Optical beam deflection elements that select a wavelength and deflect an optical beam to a desired output port are used in wavelength selective optical switches, and that which uses a diffraction phenomenon by liquid crystal on silicon (LCOS) is used in Patent Documents 1 and 2. Further, that which uses mechanical displacement of a mirror array, or MEMS (micro-electro-mechanical system), is used in Patent Documents 3 and 4.

DOCUMENTS OF THE RELATED ART

Patent Documents

[Patent Document 1] U.S. Pat. No. 7,787,720B2
[Patent Document 2] U.S. Pat. No. 7,397,980B2
[Patent Document 3] U.S. Pat. No. 7,162,115B2
[Patent Document 4] U.S. Pat. No. 6,707,959B2

SUMMARY OF THE INVENTION

Meanwhile, in the field of optical communications, optical networks have become more complicated with advancements in research and development in accelerating transmission rates and new modulation formats in response to demand for transmission capacity in recent years. Dynamic control and functionality of filter centered wavelengths is desired in this type of optical network in addition to conventional wavelength selective functionality to implement optimal filtering for transmission rate and modulation format of wavelength multiplexed signals (WDM signals). These functions can be realized by using a high definition LCOS element that can assign a plurality of pixels per each wavelength band of a WDM signal.

However, a LCOS element has polarization dependence on the deflection function. Accordingly, with a wavelength selective switch that uses an LCOS element, light of the s polarized light and the p polarized light that complete the polarization axis must enter the LCOS element by separating the incident light by polarization directions. If there is a difference in the optical path length of the s polarized light and the p polarized light at this time, the optical image height of the s polarized beam and the p polarized beam will not align when the exiting light is taken into the optical fiber causing a problem of insertion loss. Furthermore, because the optical image height of the s polarized beam and the p polarized beam does not align, a problem occurs in that a difference in the loss of the s polarized beam and the p polarized beam occurs, which is to say that polarization dependent loss (PDL) occurs.

One or more embodiments of the present invention are made to target one or more of these type of conventional problems and have an objective to realize a wavelength selective switch that has little insertion loss and polarization dependent loss.

In one aspect, the wavelength selective switch device in accordance with one or more embodiments of the present invention includes: an incidence part where wavelength multiplexed light made of light of a plurality of wavelengths enters; an exit part that includes a plurality of fiber that output light of a wavelength selected from a signal in which wavelength multiplexed light that entered from the incidence part enters; a polarization diversity part that separates incidence light that entered the incidence part according to polarization components of the incidence light to make first and second optical beams, and synthesizes by aligning a polarization direction by rotating the polarization direction of one of the first and second optical beams and rotating a polarization direction of an exiting light of one of a first and second reflected light having an identical wavelength; a wavelength dispersion and synthesis element that spatially disperses incidence light according to a wavelength of the incidence light and multiplexes the spatially dispersed reflected light according to the wavelength;

a condensing element that condenses the incidence light that was separated by the wavelength dispersion and synthesis element onto a two-dimensional plane; a liquid crystal beam deflection element arranged in a position to receive incident light developed on an xy plane from an x axis direction and a y axis direction perpendicular thereto developed according to a wavelength, wherein the liquid crystal beam deflection element has a multiplicity of pixels arrayed in a lattice on the xy plane, changes refractive index characteristics of the pixels by changing the phase of the plurality of pixels continuous in the y axis direction, and changes the reflection direction of each wavelength; a liquid crystal beam deflection element drive part that changes the phase shift characteristics for each wavelength by driving an electrode of each pixel arrayed in the xy direction of the liquid crystal beam deflection element, and that reflects light to a different direction for each wavelength; and an image height adjusting medium provided in a position where a beam of either exiting light of the first or second beam passes through, and matches the image height of each polarization at the optical fiber of the output part.

Here, the liquid crystal beam deflection element is a LCOS element having a multiplicity of pixels arrayed two-dimensionally, and the liquid crystal beam deflection element drive part may be made to control the voltage applied to each pixel according to wavelength selection characteristics.

Here, the liquid crystal beam deflection element is a liquid crystal element having a multiplicity of pixels arrayed two-dimensionally, and the liquid crystal beam deflection element drive part may be made to control the voltage applied to each pixel according to wavelength selection characteristics.

Here, the polarization diversity part may be made to include a polarizing beam splitter that separates incidence light into a first and second optical beam according to a polarization direction, and a wavelength plate that aligns a polarization direction of one side of the divided light to a polarization direction of the other light.

Here, the image height adjusting medium may be made to be a meniscus lens.

According to one or more embodiments of the present invention having these types of characteristics, light in which incident light has been wavelength dispersed can be made to accommodate a plurality of pixels arrayed in the dispersion direction, and each wavelength component of the incident light can be reflected in different directions by changing the refractive index of the pixels. Further, as this is configured so as to correct optical image height of s polarized light and p polarized light, loss and polarization dependent loss can be reduced. Accordingly, the present invention is effective in a wavelength selective optical switch, and particularly in a wavelength selective switch having many ports.

DETAILED DESCRIPTION OF THE INVENTION

First Embodiment

Figure 1A:
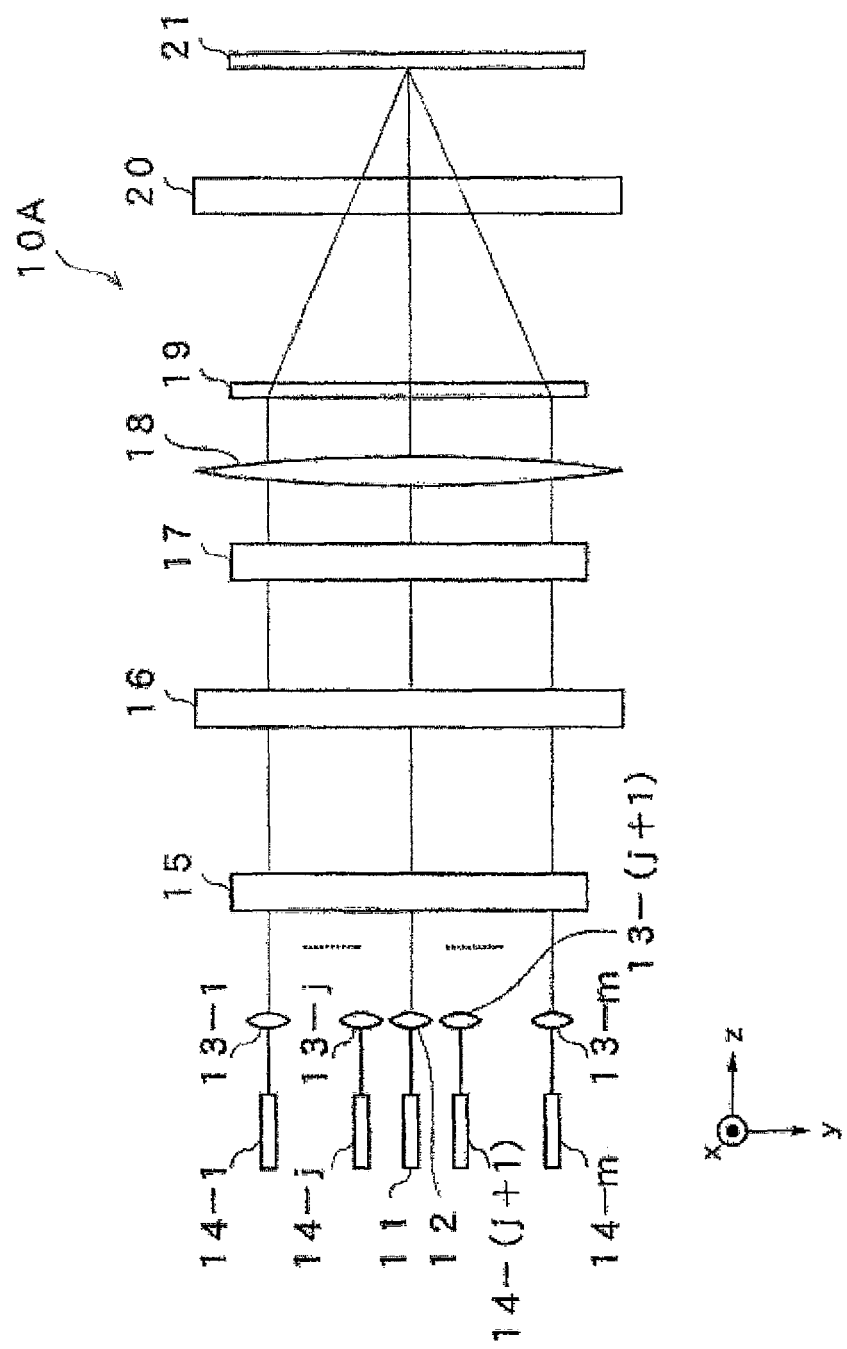
FIG. 1A is a drawing illustrating an optical arrangement as viewed from the x axis direction of a reflective type wavelength selective optical switch device according to the first embodiment of the present invention.
Figure 1B:
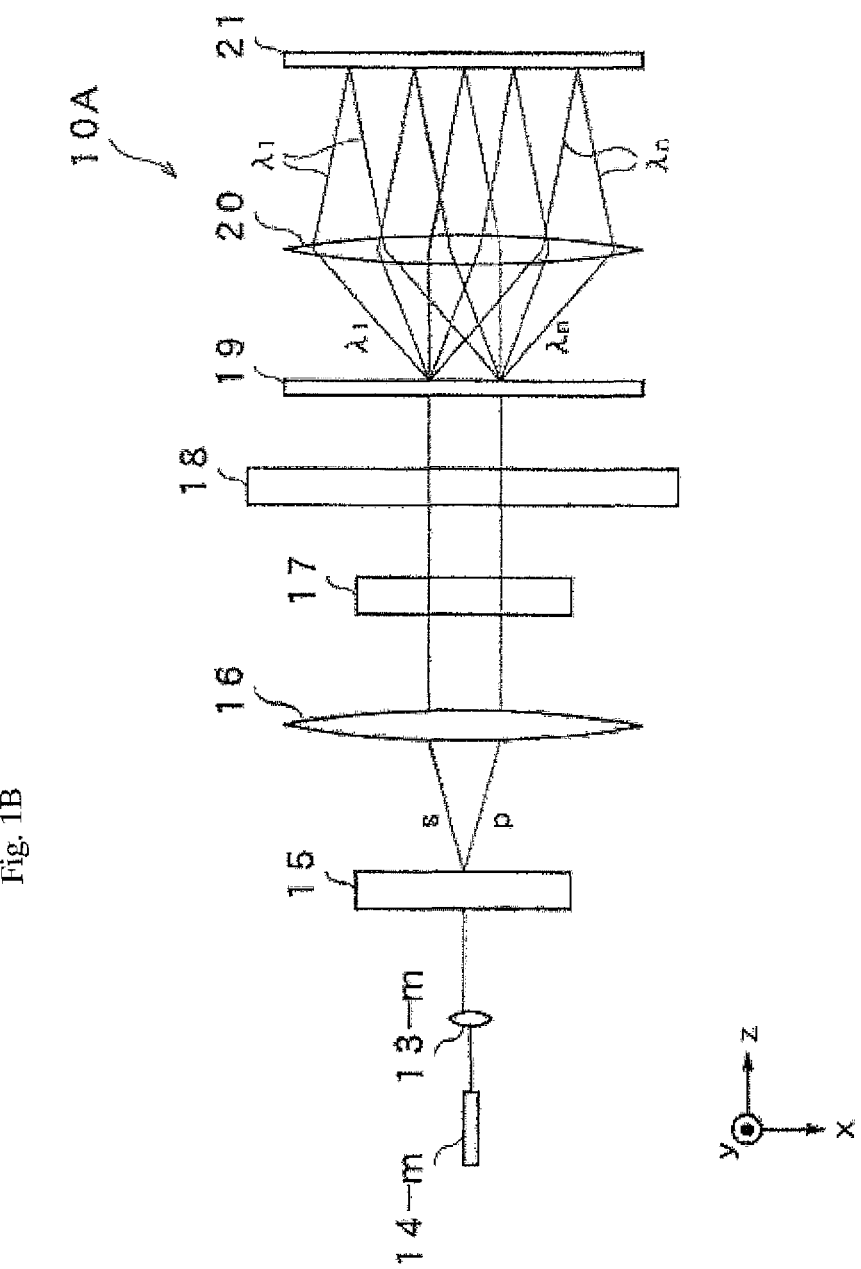
FIG. 1B is a drawing illustrating an optical arrangement from the y axis direction of a reflective type wavelength selective optical switch device according to the first embodiment of the present invention.

FIG. 1A is a side view as viewed from the x axis direction illustrating a configuration of an optical element of a reflective type wavelength selective optical switch device 10A according to the first embodiment of the present invention, and FIG. 1B is a side view as viewed from the y axis thereof. The incident light is a multiplexed optical signal of wavelengths $\lambda_1$ to $\lambda_n$ as a WDM signal. The WDM light exits to a collimate lens 12 via optical fiber 11. Further, light that has entered into collimate lenses 13-1 to 13-$m$ adjacent to the collimate lens 12 exits from optical fiber 14-1 to 14-$m$ arranged in parallel to optical fiber 11 respectively. Here, j and m are natural numbers, and J>M. The WDM light that exits into space from the collimate lens 12 is parallel to the z axis, and the WDM light enters into a polarization diversity part 15. The polarization diversity part 15 separates the incident light into an s polarization component and a p polarization component that are the first and second light beams, and has a function to align the two polarization directions by using a wavelength plate or the like. The light that has passed through the polarization diversity part 15 is added to the x direction condenser lens 16. The lens 16 condenses the incident light to the x direction, and the condensed light is transmitted to the output optical axis corrector plate 17. The output optical axis corrector plate 17 allows the incident light traveling to the right direction in the drawing to pass through as is and is an image height adjusting medium for aligning optical axis difference between the s polarization component and the p polarization component of the exiting light traveling to the left direction of each channel. The light that has passed through the output optical axis corrector plate 17 is provided to the wavelength dispersion and synthesis element 19 via a condenser lens 18. The wavelength dispersion and synthesis element 19 disperses the incident light in different directions on an xz plane according to wavelength and synthesizes the reflected light in different directions on the xz plane according to wavelength. Here, the wavelength dispersion and synthesis element 19 may be a diffraction grating or it may be a prison and the like. Furthermore, it may also have a combined configuration of a diffraction grating and a prism. The light dispersed by the wavelength dispersion and synthesis element 19 is provided to the lens 20. The lens 20 is a condensing element that condenses the light that has been dispersed on the xz plane in parallel in the z axis direction, and the condensed light enters a liquid crystal beam deflection element 21.

Note that although the description given in FIG. 1B is an example illustrating light of a longest wavelength $\lambda_1$ to a shortest wavelength $\lambda_n$, because the incident light is a WDM signal beam having a number of specters between $\lambda_1$ to $\lambda_n$, the WDM signal beam developed along the xz plane is added to the liquid crystal beam deflection element 21 in the form of a band. The liquid crystal beam deflection element 21 reflects the incident light in different directions according to the wavelength, and the selection characteristics for the wavelength selective optical switch are determined according to the reflective properties and a detailed description will be given hereinafter. The light that has been reflected by the liquid crystal beam deflection element 21 is added to the lens 20 through the same path and is added again to the wavelength dispersion and synthesis element 19. The wavelength dispersion and synthesis element 19 converges the reflected light in the same direction as the original incident light, and the converged light enters into the output optical axis corrector plate 17. The output optical axis corrector plate 17 aligns the optical axis difference of the s polarization component and the p polarization component of the exited light of each channel. The light that has passed through the output optical axis corrector plate 17 enters the lens 16. The lens 16 converts the light on the same path as the incident light into light that is parallel to the z axis, and it enters into the polarization diversity part 15. The polarization diversity part 15 aligns the two polarization directions using a wavelength plate or the like on the exiting light, and it has the function that synthesizes the exiting light of each channel of the s polarization component and the p polarization component for each channel. The light that was synthesized by the polarization diversity part 15 exits to the optical fiber 14-1 to 14-$m$ respectively via the collimate lenses 13-1 to 13-$m$. Here, the optical fiber 11 and the collimate lens 12 is configured of an incidence part where the WDM signal beam enters, and the optical fiber 14-1 to 14-$m$ and the collimate lenses 12 and 13-1 to 13-$m$ are configured of an exit part where the selected light exits.

Second Embodiment

Figure 2:
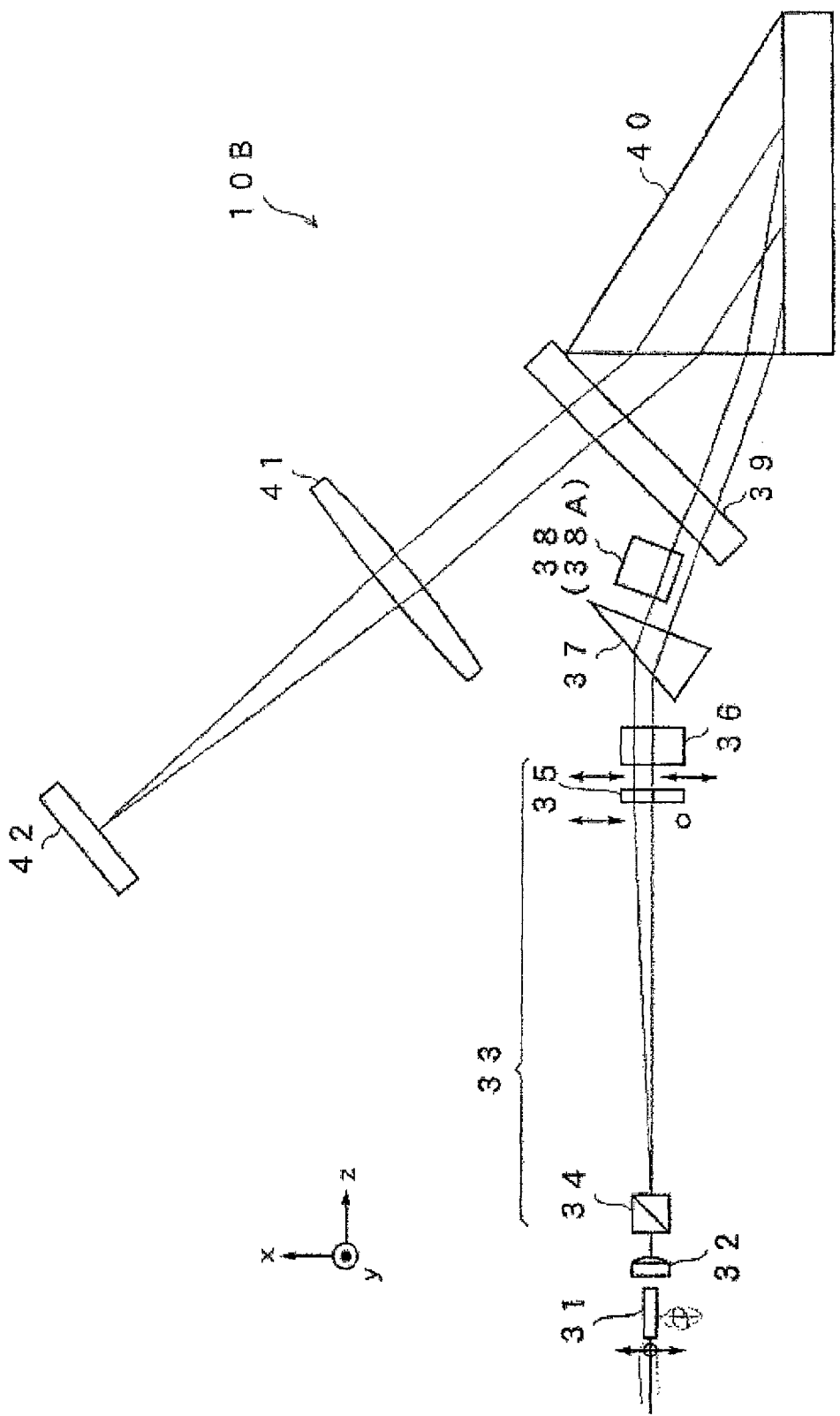
FIG. 2 is a drawing illustrating an optical arrangement as viewed from the x axis direction of a reflective type wavelength selective optical switch device according to the second embodiment of the present invention.
Figure 3:
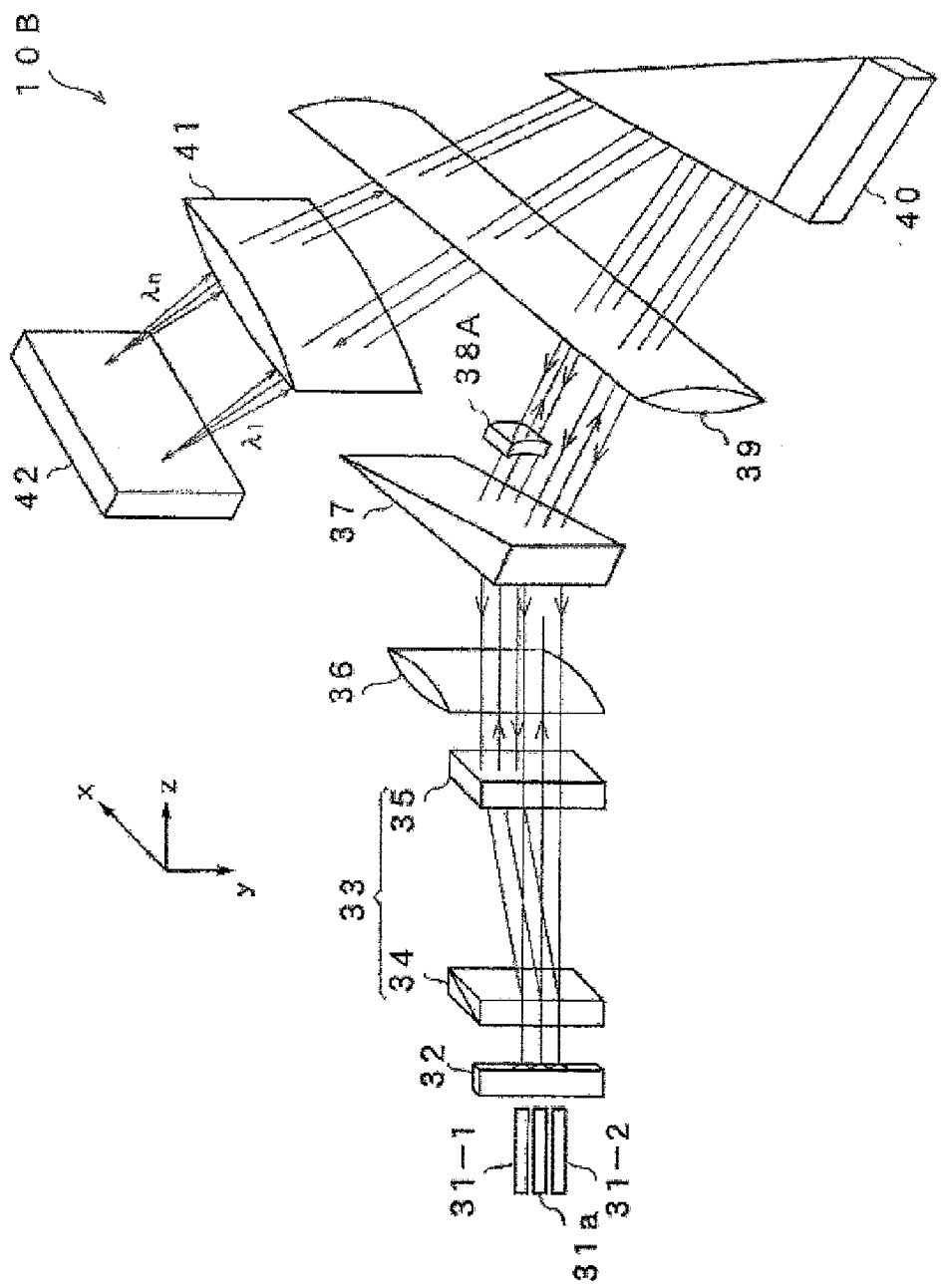
FIG. 3 is a perspective view illustrating an outline of a reflective type wavelength selective optical switch device according to the second embodiment of the present invention.

Next, the description will be given of a wavelength selective optical switch device 10B according to a specific second embodiment of the present invention. FIG. 2 is a side view as viewed from the y axis direction illustrating a configuration of an optical element of a reflective type wavelength selective optical switch device according to the second embodiment of the present invention, and FIG. 3 is a perspective view of an outline thereof. The incident light in FIG. 2 is also a WDM signal as described in the first embodiment, and it enters the collimate lens array 32 from the optical fiber array 31. The optical fiber array 31 has a multiplicity of exiting optical fiber 31-1 to 31-$m$ arranged in parallel to one strand of incoming optical fiber 31$a$. Furthermore, the collimate lens array 32 has an incoming collimate lens 32$a$ and a number of outgoing collimate lenses 32-1 to 32-$m$ arrayed in parallel, and it corresponds to the collimate lenses 12 and 13-1 to 13-$m$ of the first embodiment. The light that passes through the collimate lens of the incident side enters into a polarizing beam splitter 34 of a polarization diversity part 33 as parallel optical beams. The polarizing beam splitter 34 and separates the incident light in the xz plane into p polarization and s polarization components and is implemented by, for example, a Wollaston prism. Note that in FIG. 2, the p polarization component is indicated by a vertical arrow and the s polarization component is indicated by a circle. The light separated by the polarizing beam splitter 34 enters into a wavelength plate 35. The wavelength plate 35 is a $\lambda/2$ wavelength plate that allows the p polarized light to pass through as is at the output side of the polarizing beam splitter while converting the polarization direction of the s polarization component into p polarized light, and it can align the polarization directions of the two optical beams. In this way, two optical beams can enter into the condenser lens 36 of the x axis direction as parallel optical beams. A magnifying prism 37 that magnifies the optical axis is provided on the optical axis of the lens 36, and additionally, an output optical axis corrector plate 38 is provided. The output optical access corrector plate 38 allows the incident light traveling in the right direction in the drawing to pass through as is. The light that has passed through the output optical axis corrector plate 38 is provided to the lens 39. The lens 39 is a lens that condenses the light in the x axis direction, and the output thereof is provided to a light dispersion and synthesis element 40. In this embodiment, the wavelength dispersion and synthesis element 40 is implemented by a combined element (Grism) of a diffraction grating and a prism. The wavelength dispersion and synthesis element 40 disperses the incident light into different directions according to the wavelength. The dispersed light is converged in a perpendicular direction to a liquid crystal beam polarizing (sic) element 42 by a lens 41 after passing through the lens 39. The liquid crystal beam deflection element 42 is arranged perpendicular to the optical axis of the lens 41 and light enters perpendicularly. The liquid crystal beam deflection element 42 reflects incident light in a desired direction by wavelength, and a detailed description will be given hereinafter. The light that was reflected by the liquid crystal beam deflection element 42 is added to the lenses 41 and 39 and passes through the same path as the incident light. The output optical axis corrector plate 38 ensures a constant optical path difference for the light of the s polarization component and the p polarization component by slightly shifting the polarization direction only that portion that corresponds to the distance offset from the center in the xz plane from among the two exiting beams of the same wavelength, and this is implemented by a meniscus lends 38A in this embodiment. The light that passed through the output optical axis corrector plate 38 is output from an output optical fiber of the optical fiber array 31 through the same path as the incident light.

Note that in the perspective view illustrated in FIG. 3, when m=2, this indicates that there are two exiting optical fibers for the incident optical fiber, and that only the light of wavelengths $\lambda_1$ to $\lambda_n$ dispersed by the wavelength dispersion and synthesis element 40 are illustrated as reflected light. The incident light is separated into an s polarization component and a p polarization component by the polarization diversity part 33, and only the p polarization component passes through the center of the meniscus lens 38A. Meanwhile, only the p polarization component of the exiting lights ($\lambda_1$ and $\lambda_n$) of each channel enters a position separated from the center of the meniscus lens 38A, and the optical axis shifts so as to enter into the magnifying prism 37. Further, after the p polarization component of the wavelength $\lambda_n$ also passes through the periphery of the meniscus lens 38A, the optical axis shifts. Because it enters into the magnifying prism 37 while the optical axis is magnified in this manner, the optical axis is reduced and is added to the polarization diversity part 33 via the lens 36 to thereby be synthesized as a single exiting beam.

Configuration of Liquid Crystal Beam Deflection Element

Figure 4:
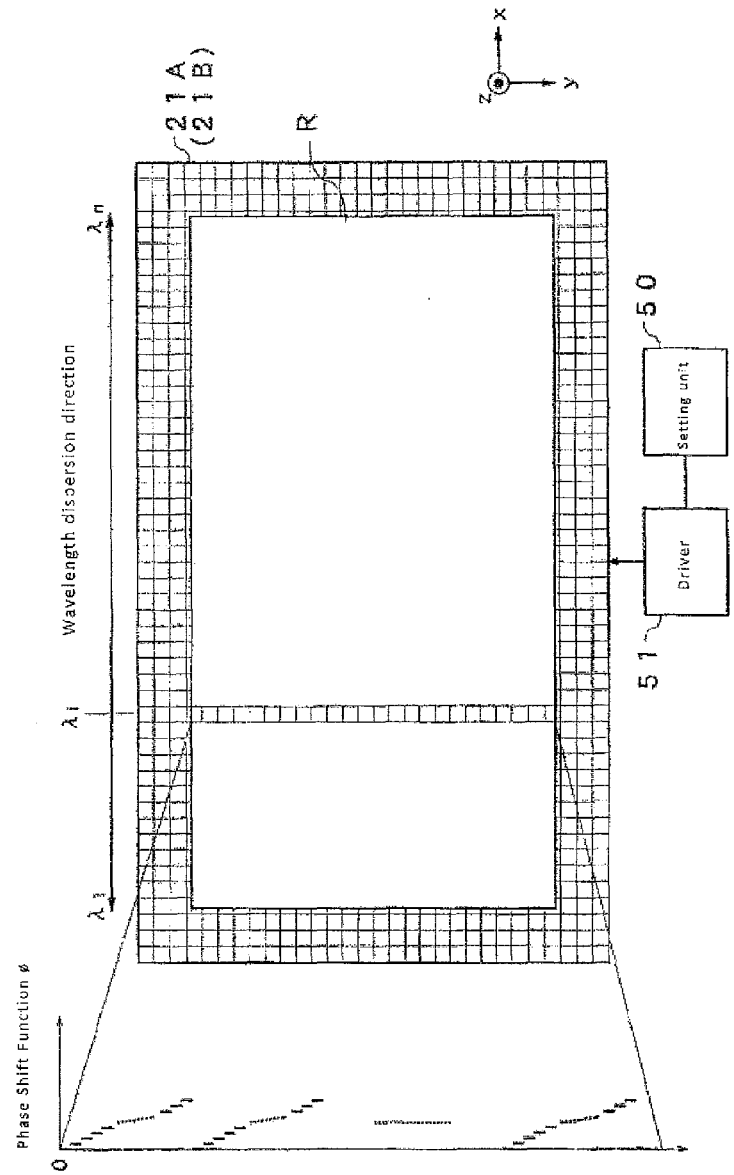
FIG. 4 is a drawing illustrating a two-dimensional liquid crystal beam deflection element used in the wavelength selective optical switch device according to the first and second embodiments of the present invention.

Next, a description will be given here of liquid crystal beam deflection element 21 and 42 used in a wavelength selective optical switch device according to the first and second embodiments. The liquid crystal beam deflection element 21 and 42 may be identical devices, therefore, the description given below will refer to the liquid crystal beam deflection element 21. In the first embodiment, incident light is dispersed on the xz plane according to the wavelength, and when the two beams of the s polarized light and the p polarized light enter the liquid crystal beam deflection element 21 as a single band of light in the same location and having the same wavelength, the incident region thereof is the region R having a rectangular shape indicated in FIG. 4. Selecting the direction to reflect according to each wavelength of incident light added to this region R enables any wavelength of light to be selected and guided to any output fiber. A setting unit 50 is connected to the liquid crystal beam deflection element 21 via a driver 51. The setting par 50 is set by matching the pixels that reflect the light of the xy plane to the selected wavelength. The setting unit 50 and the driver 51 configure the liquid crystal beam deflection element drive part that controls the characteristics of the pixels at a specified position of the x axis and y axis directions by driving the electrodes of each pixel arrayed in the xy direction of the liquid crystal beam deflection element.

Figure 5A:
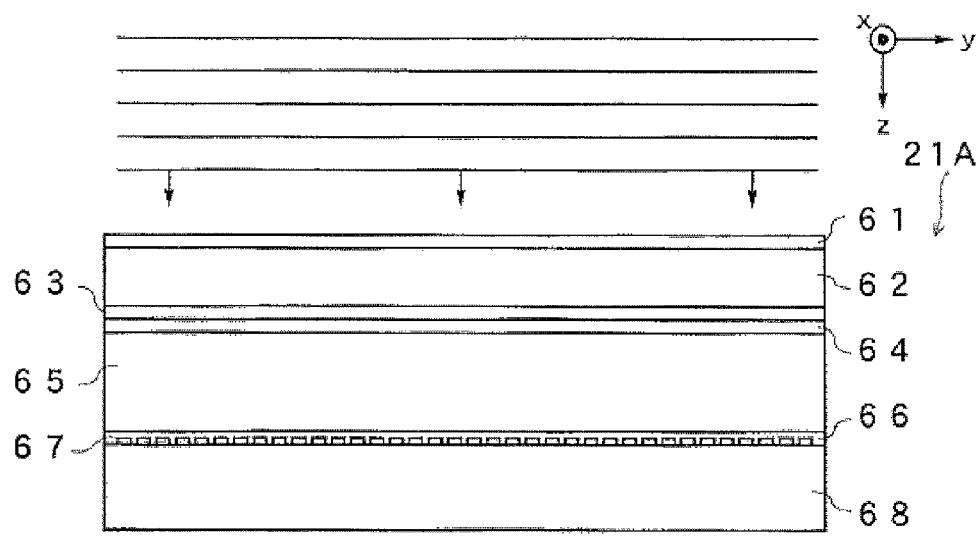
FIG. 5A is a drawing illustrating a structure of a wavelength selection element and the input of light into the wavelength selection element of the wavelength selective optical switch device according to the first and second embodiments of the present invention.

Next, a description will be given of a specific configuration of the liquid crystal beam deflection element 21. The liquid crystal beam deflection element 21 can be implemented by using a liquid crystal on silicon (LCOS) liquid crystal element. Because the LCOS element 21A has a built-in liquid crystal driver on the backplane of each pixel, the pixel count can be increased and can be configured from a multiplicity of lattice shaped pixels of, for example, 1920×1080. FIG. 5A is an outline diagram illustrating the LCOS element 21A and is configured by layering along the z axis from the surface where light enters an AR layer 61, glass layer 62, transparent common electrode layer 63, alignment layer 64, liquid crystal 65, alignment layer 66 that includes a multiplicity of backplane reflective electrodes 67, and a silicone layer 68.

Figure 5B:
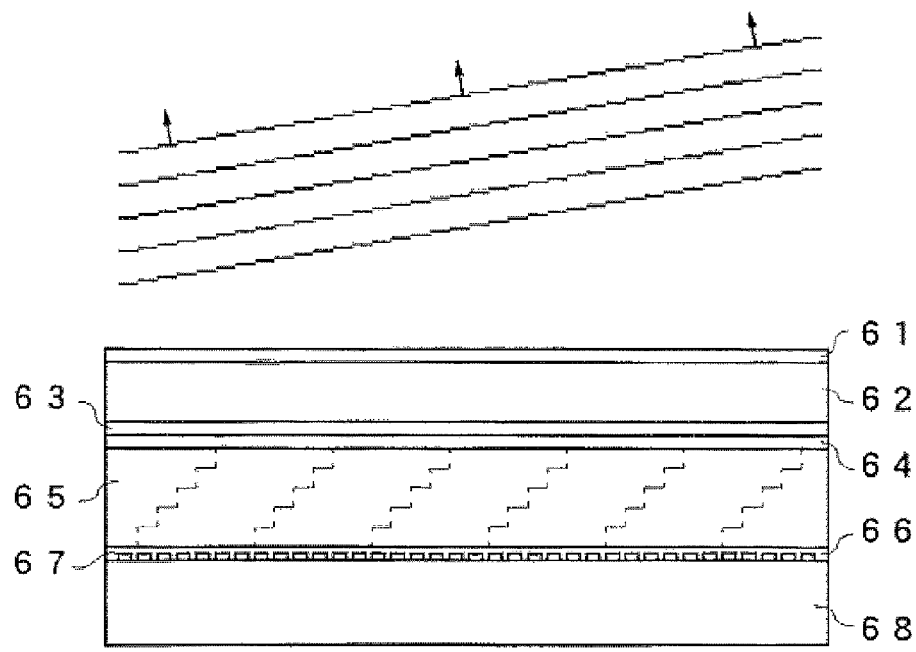
FIG. 5B is a drawing illustrating the reflection of light from the wavelength selection element.
Figure 6:
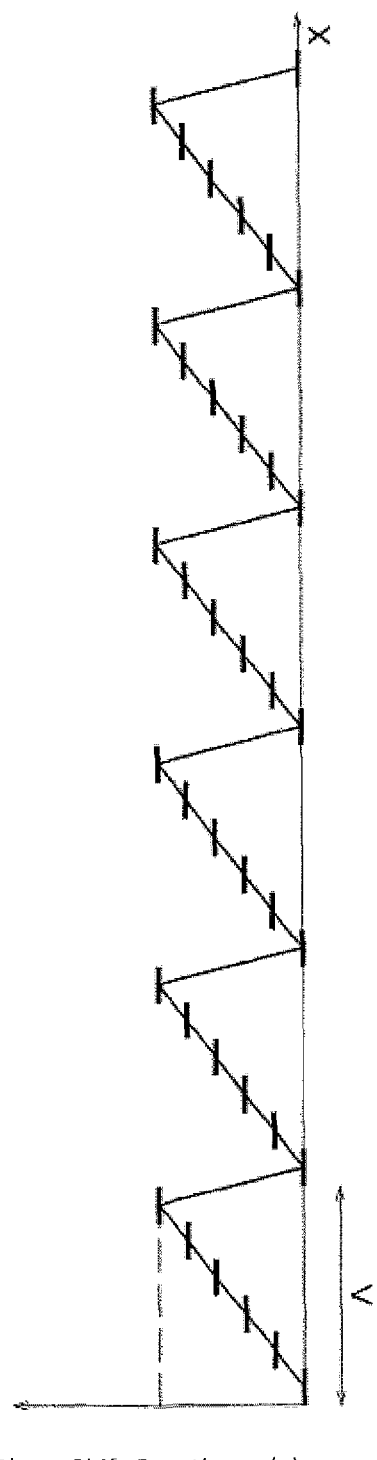
FIG. 6 is a drawing illustrating the relationship between the incident position of an LCOS element and the phase shift according to this embodiment.

The light added to the incident region R of the LCOS element 21A is light in which the WDM beam is developed on the xy plane according to a wavelength band $\lambda_i$ (i=1 to n). Here, when the wavelength dispersion direction is the x axis direction indicated in FIG. 4, a multiplicity of pixels lined up in the y axis direction correspond to respective wavelengths. Therefore, providing different cyclical voltages to a multiplicity of y axis direction pixels where a beam of wavelength $\lambda_1$ of the LCOS element 21A enters, allows the refractive index to change to an overall saw tooth shape expressed by a stepped phase shift function such as that illustrated on the left side of FIG. 4. FIG. 6 is a drawing illustrating the relationship between this phase shift function and the beam incident position. In FIG. 6, the phase shift amount is changed in steps by a plurality of pixels, herein six pixels, and the change is repeated in cycles so as to implement a function equivalent to a braided type diffraction grating. Note that in the drawing, the linear saw tooth wave indicates a case of a braided type diffraction grating, and the stepped shape waveform indicates a case of an LCOS element having a multiplicity of levels. By changing the refractive index in this manner, a multilevel beam phased array can be implemented, and differing reflective directions such as that illustrated in FIG. 5B are possible by the diffraction phenomenon. Here, appropriately selecting the phase shift function enables the refraction angle of incident light to be changed in different directions according to each wavelength respectively, and thus, the LCOS element can be considered a variable characteristic type diffraction grating. Therefore, the diffraction angle of each wavelength component can be independently controlled by applying voltage between the transparent electrode 63 and the backplane reflective electrode 67 while being able to reflecting input light of a specific wavelength in a desired direction, diffracting light of other wavelength components as unnecessary light, and reflecting light in a direction that does not exit.

Next, the diffraction angle of the multilevel beam phased array is expressed by equation (1).

$$\sin\theta_{in} + \sin\theta_{diff} = k \cdot \lambda / \Lambda \quad (1)$$

Wherein,
q: number of multi levels
k: diffraction order
$\lambda$: wavelength
$\Lambda$: phased array pitch
$\theta_{in}$: incident angle
$\theta_{diff}$: diffraction angle Further, the diffraction efficiency is approximately expressed by equation (2).

$$\eta = (\sin(\pi/q)/(\pi/q))^2 \quad (2)$$

Further, when the pitch of the LCOS element pixels is d, the following function is established between the phased array pitches $\Lambda$.

$$\Lambda = q \cdot d \quad (3)$$

In addition, a description will be given of a liquid crystal element 21B having a reflective type two-dimensional electrode array that does not have a LCOS structure as a second example of a liquid crystal beam deflection element 21. Although a liquid crystal driver is built-in to the backplane of the pixels for a LCOS element, a two-dimensional electrode array liquid crustal element 21B is provided with a liquid crystal modulating driver external to the element. Such other configuration is similar to the LCOS element, and the reflection angle can be controlled according to each wavelength as in the LCOS element given above by analogously changing the voltage level for the pixels.

Here, specific wavelength bands can be reflected in the same direction by controlling the phased array at any width. Therefore, as long as the number of pixels in the x axis direction of a wavelength band that provides a phase shift function on the same step is appropriately selected, the width of the wavelength band for switching to the same direction can be freely changed by changing the reflective characteristics of the liquid crystal beam deflection element 21 for each pixel.

Figure 7:
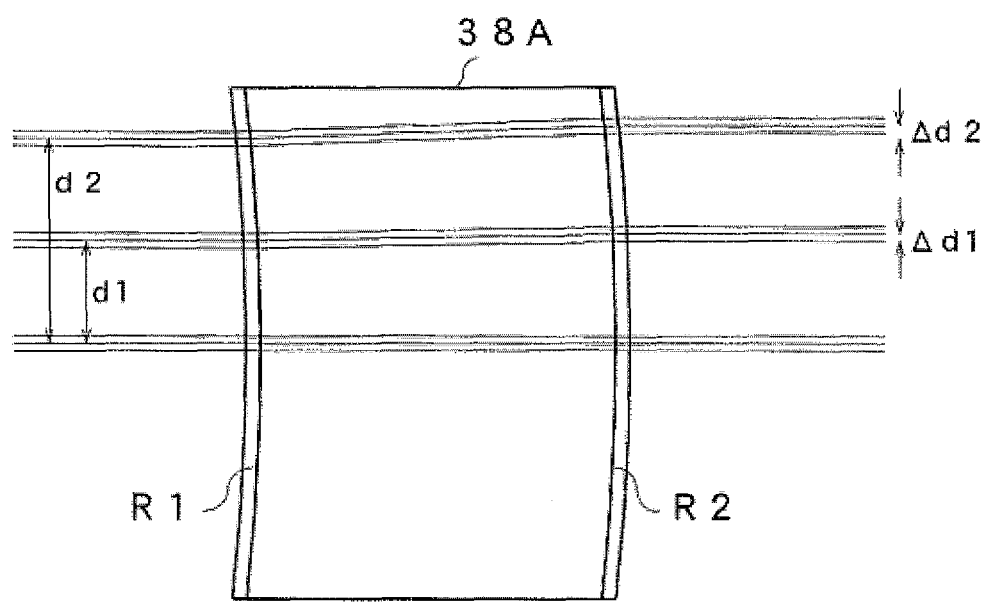
FIG. 7 is a drawing illustrating a meniscus lens according to the second embodiment.
Figure 8:
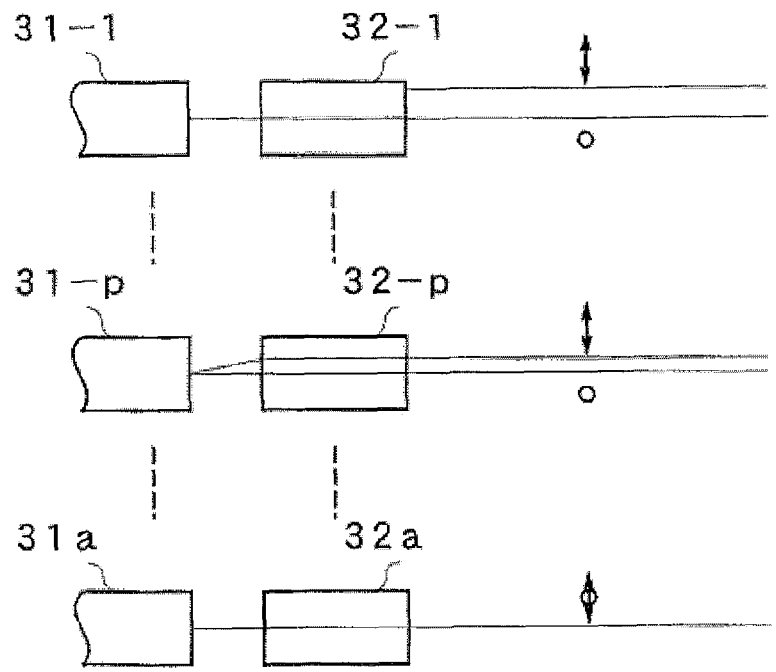
FIG. 8 is a drawing illustrating the offset amount between the s polarized beam and the p polarized beam at the position of the optical fiber for exiting when the meniscus lens according to the second embodiment is not used.
Figure 9:
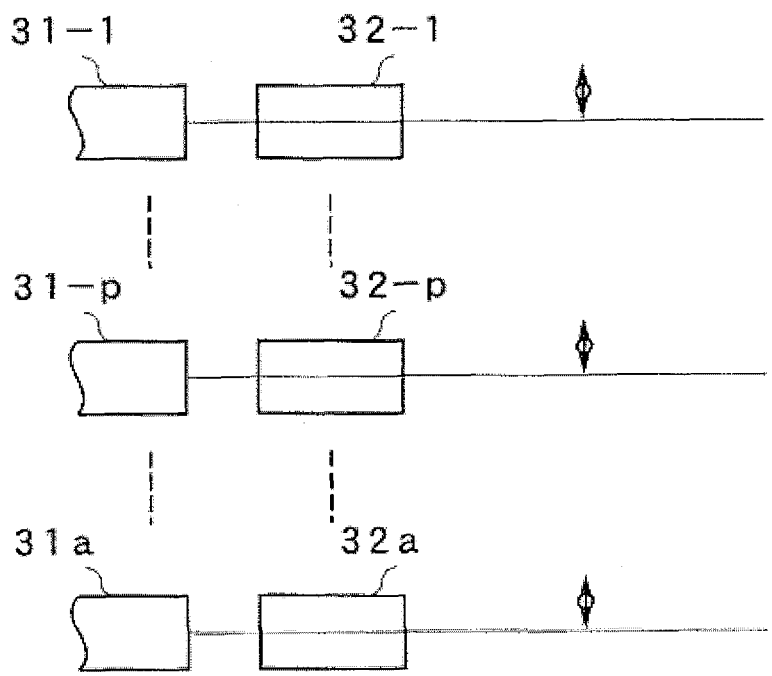
FIG. 9 is a drawing illustrating the position offset of light at the optical fiber for exiting when the meniscus lens according to the second embodiment is used.

Next, a description will be given of an output optical axis corrector plate 38. The output optical axis corrector plate 38 in the second embodiment uses a meniscus lens 38A. FIG. 7 is a cross-sectional view illustrating one example of the meniscus lens 38A. This lens is, for example, a BK7 material, 3 mm thickness, and both the left side curvature radius R1 and right side curvature radius R2 are 19.07 mm. Further, when the wavelength of light that passes through the meniscus lens 38A is 1.55 μm, light that entered from the center as illustrated in the drawing can be obtained on the exiting side as is without being vertically shifted. Meanwhile, for the input beam 2 that is displaced, for example, d1 upwards from the center, a parallel beam can be obtained that is further displaced Δd1 upward by this. For the beam 3 input in the same manner, it is displaced d2 upward from the center, and this output is obtained at a position further displaced Δd2 from the exit beam of the center. D1 is, for example, 0.8 mm; d2 is, for example, 1.6 mm; Δd1 is, for example, 42 μm; and Δd2 is, for example, 84 μm. Therefore, when the meniscus lens 38A is not used in optical fiber 31-*p* in which there is a 0.8 mm separation from the input fiber and not used in output fiber 31-1 having a further 0.8 mm separation, a shape such as that in FIG. 8 results even in a position of the micro lens array 32, and the s polarization component and the p polarization component have displacement. In contrast to this, using the meniscus lens allows this type of position displacement to be alleviated. In other words, as illustrated in FIG. 9, inserting into the optical path of either one component of the s polarized light or the p polarized light enables beam positions between polarizations of the y direction to be aligned and allows for corrections to be made at submicron precision.

Note that the specifics of the lens of the meniscus lens structure are one example, and that the meniscus lens of the lens surface of the left side does not need to be the same, and a meniscus lens having a different shape can be used according to the desired amount of optical axis output displacement. Further, other than a meniscus lens, corrections can be made by placing a glass plate that equates to the displacement amount of the optical path length.

In addition, in this embodiment, although the input signal is a WDM signal beam, it is not limited to a WDM signal beam, and a multiplexed beam of a multiplicity of wavelengths can be applied to this invention.

INDUSTRIAL APPLICABILITY

According to one or more embodiments of the invention as described in detail above, light of any wavelength can be selected to configure a wavelength multiplexed signal by changing the various reflective characteristics of the liquid crystal beam deflection element. Further, the s polarization component and p polarization component can be guided to output fiber without insertion loss at the output by having one of the polarized beams pass through an output optical axis corrector plate thereby being able to avoid loss that accompanies polarization dependence. This can be favorably used as a wavelength selective switch making up a main compositional element of a node of a WDM signal in which there are particularly many output channels.

DESCRIPTION OF THE NUMERICAL REFERENCES 11, 14-1 to 14-*m* optical fiber
12, 13-1 to 13-*m* collimate lens
15, 33 polarization diversity part
17, 38 output optical axis corrector plate
19, 40 wavelength dispersion and synthesis element
21, 42 liquid crystal beam deflection element
21A two-dimensional LCOS element
21B two-dimensional electrode array liquid crustal element
38A meniscus lens
31 optical fiber array
32 collimate lens array
34 polarizing beam splitter
35 wavelength plate
16, 18, 29, 36, 39, 41 condenser lens
37 magnifying prism
50 setting unit
51 driver

What is claimed is:

1. A wavelength selective switch device, comprising:
an incidence part where input wavelength multiplexed light comprising a plurality of wavelengths enters along an input direction;
an exit part comprising a plurality of fibers that outputs, along an output direction, output wavelength multiplexed light comprising selected wavelengths from the plurality of wavelengths;
a polarization diversity part that:
separates the input wavelength multiplexed light travelling along the input direction according to polarization components to make a first and a second optical beam; and
synthesizes a third and a fourth optical beam both having the selected wavelengths and travelling along the output direction by aligning a polarization direction of one of the third and the fourth optical beam with the other of the third and the fourth optical beam to generate the output wavelength multiplexed light comprising the selected wavelengths;
a wavelength dispersion and synthesis element that:
spatially disperses the first and second optical beams travelling along the input direction according to the plurality of wavelengths to generate spatially dispersed light travelling along the input direction; and
wavelength multiplexes spatially dispersed and wavelength selected light travelling along the output direction to generate the third and the fourth optical beams;
a condensing element that condenses the spatially dispersed light travelling along the input direction onto a two-dimensional liquid crystal beam deflection element;
the two dimensional liquid crystal beam deflection element comprising a plurality of pixels arrayed in a lattice on an xy plane, with an x-axis direction defining a wavelength dispersion direction, and wherein changes in refractive index characteristics of the pixels changes a phase of the plurality of pixels along the y axis direction, and changes the output direction of each wavelength of the spatially dispersed light to generate the direction;
a liquid crystal beam deflection element drive part that changes the refractive index characteristics of the pixels by driving an electrode of each pixel; and
an image height adjusting medium (IHAM) disposed at a position to receive either the third or the fourth optical beam, such that one of the third or the fourth optical beam passes through the IHAM and the other of the third or the fourth optical beam does not pass through the IHAM, and the IHAM adjusts an image height of the third or the fourth beam that passes through the IHAM to match an image height of the third or fourth optical beam that does not pass through the IHAM, wherein the image height is defined to be a height of the optical beams relative to the plurality of optical fibers of the exit part.

2. The wavelength selective switch device according to claim 1, wherein
the liquid crystal beam deflection element is a LCOS element having a multiplicity of pixels arrayed two-dimensionally, and
the liquid crystal beam deflection element drive part controls the voltage applied to each pixel according to wavelength selection characteristics.

3. The wavelength selective switch device according to claim 1, wherein
the liquid crystal beam deflection element is a liquid crystal element having a multiplicity of pixels arrayed two-dimensionally, and
the liquid crystal beam deflection element drive part controls the voltage applied to each pixel according to wavelength selection characteristics.

4. The wavelength selective switch device according to claim 1, wherein
the polarization diversity part includes:
a polarizing beam splitter that separates the input wavelength multiplexed light into the first and second optical beams, and
a wavelength plate that aligns the polarization direction of one of the third and the fourth optical beam with the other of the third and the fourth optical beam.

5. The wavelength selective switch device according to claim 1, wherein the image height adjusting medium is a meniscus lens.

6. A method of switching wavelength multiplexed light comprising a plurality of wavelengths using a wavelength selective switch device, the method comprising:
receiving, by a polarization diversity part, the wavelength multiplexed light;
separating, by the polarization diversity part and according to polarization components, the wavelength multiplexed light to generate a first and a second optical beam;
spatially dispersing, by a wavelength dispersion and synthesis element, the first and second optical beams to generate spatially dispersed light;
condensing, by a condensing element, the spatially dispersed light onto a two-dimensional liquid crystal beam deflection element,
wherein the liquid crystal beam deflection element comprises a plurality of pixels that when driven change the reflected output direction of each wavelength of spatially dispersed light to generate spatially dispersed and wavelength selected light comprising wavelengths selected from the plurality of wavelengths;
multiplexing, by the wavelength dispersion and synthesis element, the spatially dispersed and wavelength selected light to generate a third and a fourth optical beam both having the selected wavelengths;

passing one of the third or the fourth optical beam through an image height adjusting medium (IHAM) to adjust an image height of the one of the third or fourth optical beam to match an image height of the third or the fourth optical beam that did not pass through the image height adjusting medium, wherein the image height is defined to be a height of the optical beams relative to a plurality of optical fibers of an exit part of the wavelength selective switch device;

synthesizing, by the polarization diversity part, the third and the fourth optical beams by aligning a polarization direction of one of the third or the fourth optical beam with the other of the third or the fourth optical beam to generate output wavelength multiplexed light; and coupling the output wavelength multiplexed light into a fiber from the plurality of optical fibers of the exit part.

7. The method according to claim 6, wherein
the liquid crystal beam deflection element is a LCOS element having a multiplicity of pixels arrayed two-dimensionally, and
the liquid crystal beam deflection element drive part controls the voltage applied to each pixel according to wavelength selection characteristics.

8. The method according to claim 6, wherein
the liquid crystal beam deflection element is a liquid crystal element having a multiplicity of pixels arrayed two-dimensionally, and
the liquid crystal beam deflection element drive part controls the voltage applied to each pixel according to wavelength selection characteristics.

9. The method according to claim 6, wherein
the polarization diversity part includes:
a polarizing beam splitter that separates the input wavelength multiplexed light into the first and second optical beams, and
a wavelength plate that aligns a polarization direction of one of the third and the fourth optical beam with the other of the third and the fourth optical beam having the selected wavelengths.

10. The method according to claim 6, wherein the image height adjusting medium is a meniscus lens.

* * * * *

UNITED STATES PATENT AND TRADEMARK OFFICE
CERTIFICATE OF CORRECTION

| | | |
|---|---|---|
| PATENT NO. | : 9,025,094 B2 | |
| APPLICATION NO. | : 13/548401 | |
| DATED | : May 5, 2015 | |
| INVENTOR(S) | : Sakurai | |

It is certified that error appears in the above-identified patent and that said Letters Patent is hereby corrected as shown below:

On the Title Page:

Item (30) Foreign Application Priority Data, insert

--November 18, 2011 (JP) 2011-244267--.

In the Claims:

Column 10, claim 1, line 2, delete "to generate the direction;" insert --to generate the spatially dispersed and wavelength selected light travelling along the output direction;--.

Signed and Sealed this
Twenty-seventh Day of October, 2015

Michelle K. Lee
*Director of the United States Patent and Trademark Office*